Patented Mar. 24, 1936

2,035,362

UNITED STATES PATENT OFFICE 2,035,362

MANUFACTURE OF STABLE SULPHURIC ACID ESTERS OF LEUCO DERIVATIVES OF VAT DYESTUFFS

Wilhelm Bauer and Ludwig Zeh, Wiesdorf, and Bernhard Bollweg, Leverkusen-on-the-Rhine, Germany, assignors, by mesne assignments, to Durand & Huguenin A.-G., Basel, Switzerland, a corporation of Switzerland No Drawing. Application July 25, 1931, Serial No. 553,192. In Germany July 30, 1930

4 Claims. (Cl. 260—37)

The present invention relates to a process of preparing stable sulphuric acid esters of leuco derivatives of vat dyestuffs.

In U. S. A. Patent 1,448,251 there is described a process for the manufacture of ester-like, water soluble compounds of vat dyestuffs, by causing leuco compounds of the latter to react with sulphuric trioxide or agents being capable to split off sulphur trioxide, in the presence of a tertiary organic base.

In accordance with the present invention the same products are obtained in considerably simpler manner and without isolating the leuco derivatives. The method of working according to our invention is by reducing the vat dyestuffs by means of hydrogen sulphide in the presence of anhydrous ammonia and in the presence of an appropriate tertiary organic base, which may be replaced partially or totally by a suitable organic solvent or diluent being inert to the components of the reaction mixture. Esterification is then performed by mixing the reaction mixture obtained as described above in the presence of a tertiary organic base with the addition product of the latter with sulphur trioxide or an agent containing free sulphur trioxide or being capable of splitting off sulphur trioxide under the conditions of working. If desired, the esters being thus formed may be converted into water-soluble salts (alkali metal salts or the like) in the usual manner.

The more detailed method of working may be as follows:—

The dyestuff to be transformed into the stable sulphuric acid ester is suspended in an appropriate tertiary organic base, such as tertiary aromatic bases, tertiary heterocyclic bases or tertiary hydrogenated isocyclic bases, for example, dimethyl-aniline, dimethyl-para-toluidine, pyridine, or a homologue thereof, quinoline, or one of its homologues, hexahydrodimethyl-aniline, etc. Hydrogen sulphide and ammonia are then passed through the mixture jointly or consecutively, and the reaction mixture is kept at normal or slightly elevated temperature, say, between about 10–50° C., until the conversion of the starting dyestuff into its leuco derivative is complete, it means, until the original coloration of the dyestuff has disappeared. Obviously, it will be possible, to add the dyestuff to the tertiary organic base already containing the ammonia or the hydrogen sulphide or both of them. Lower and higher temperatures than given above will be likewise operable in most cases and are within the scope of our invention.

The tertiary base in the above process may be replaced partly or totally by an organic solvent or diluent being inert to the components of the reaction mixture, for example, chlorobenzene, orthodichlorobenzene, trichlorobenzene or other halogenated hydrocarbons, benzene, toluene, xylenes etc.

The amounts of ammonia and of hydrogen sulphide to be applied may vary within the widest limits. Generally, we prefer to apply both of them in an amount corresponding to more than one molecular weight of each of them upon one molecular weight of the dyestuff to be reduced. Larger amounts will be operable in all cases and likewise smaller amounts will yield good results in many cases.

The reaction mixture as described above containing the dyestuff in the leuco form, is mixed with an esterifying agent. As esterifying agents the known addition products of tertiary organic bases with sulphur trioxide or agents containing free sulphur trioxide or being capable of splitting off the latter under the conditions of working, such as chlorosulphonic acid, chlorosulphonic acid esters, fuming sulphuric acid, may be applied. The esterifying agents mentioned are applied in admixture with a tertiary organic base, which may be partially replaced by an organic solvent being inert to the components of the reaction mixture. Suitable bases and organic solvents are, for example, pyridine, quinoline, or homologues of these compounds, dimethylaniline, dimethyl-para-toluidine, chlorobenzene, dichlorobenzenes, trichlorobenzenes etc. The amounts of the esterifying agents to be used may vary in wide limits. Generally we prefer to apply the same in an amount that more than two molecular proportions of sulphur trioxide are available on one molecular proportion of the leuco derivative of the vat dyestuff to be esterified. Esterification already performs at low temperatures, but slightly elevated temperatures are likewise operable and tend to accelerate the esterification process. Generally, we prefer to apply temperatures between about 5–70° C.

The sulphuric acid esters are thus obtained in form of their salts with a tertiary base. They may be isolated by pouring the reaction mixture into water. In order to transform the salts of the esters thus obtained into water soluble salts, the reaction products may be heated with an alkali, such as aqueous sodium or potassium carbonate solution, whereby the alkali metal salts of the esters are formed. Obviously, the alkali may already be added to the reaction mixture without isolating the salt of the ester with the tertiary base, whereby likewise the alkali metal salts of the esters are obtained which may be isolated by distilling off the tertiary base in vacuo or by steam distillation, dissolving the residue in water, filtering and salting out.

It should be stated that during reduction and esterification the presence of water and oxygen (air) should be avoided as far as technically possible.

The following examples illustrate our invention, without limiting it thereto, the parts being by weight:—

Example 1

292.5 parts of tetrabromoindigo are finely distributed within the six- to sevenfold quantity of dimethylaniline. The mixture is heated to about 10° C. whereafter a current of anhydrous hydrogen sulphide gas and of anhydrous ammonia is led through the mixture. The reduction, which soon begins, is finished by slightly heating. The reaction mixture thus obtained, which forms a thinly liquid, yellow paste, is then introduced at normal temperature and while excluding air into an esterifying mixture, which has been obtained from 450 parts of chlorosulphonic acid, 2000 parts of chlorobenzene and 1000 parts of dimethylaniline. The mixture is slowly heated to 40–50° C., and after esterification is finished it is poured into a warm solution of 650 parts of sodium carbonate in 6500 parts of water. The clear aqueous solution of the water soluble ester salt thus formed is separated from the dimethylaniline-chlorobenzene mixture and the sodium salt of the acid sulphuric acid ester of tetrabromoindigo is separated by salting out with sodium chloride.

In the above example the dimethylaniline used in the reduction process can be replaced by chlorobenzene with a good effect.

Example 2

3000 parts of dimethylaniline are saturated at 5° C. with anhydrous hydrogen sulphide gas (about 90 parts of hydrogen sulphide), to which solution 296 parts of thioindigo are added. The mixture is then contacted with anhydrous ammonia gas, whereafter the reduction rapidly proceeds. The brown paste thus obtained is pressed into a mixture of 900 parts of chlorosulphonic acid, 2000 parts of dimethylaniline and 4000 parts of chlorobenzene while excluding oxygen at a temperature of 10–15° C., and is thereafter esterified while slowly raising the temperature to 30–35° C.

The working up is performed by pouring the mixture into an aqueous solution of 1500 parts of calc. soda and the dimethylaniline-chlorobenzene mixture is removed by steam distillation. The remaining aqueous solution is filtered and from the filtrate the acid sulphuric acid ester of the leuco thioindigo is salted out with sodium chloride.

Example 3

3000 parts of diethylaniline are saturated under cooling with hydrogen sulphide gas. Into this solution 386 parts of the dyestuff of the formula

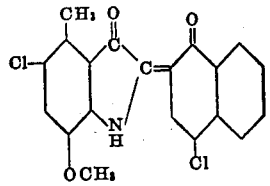

are stirred, and, under contacting with ammonia gas, the dyestuff is reduced to its yellowish-brown leuco derivative.

Esterification is performed by introducing the reaction mixture into a mixture of 750 parts of chlorosulphonic acid, 2000 parts of diethylaniline and 4000 parts of chlorobenzene.

The working up is performed as described in Example 2 by the addition of 1200 parts of calc. soda.

Example 4

The reduction of 452 parts of the dyestuff of the formula

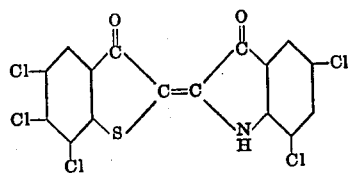

to its leuco compound is performed by introducing it into 2500 parts of dimethylaniline, saturated with hydrogen sulfide and causing a current of ammonia gas to pass through the mixture, whereby the temperature raises from 5 to 40° C. The mixture thus obtained is then introduced into a mixture of 2000 parts of dimethylaniline, 4000 parts of chlorobenzene and 900 parts of chlorosulphonic acid and esterification is performed by heating the mixture first to 15–20° C. and then to 30–35° C.

Example 5

490 parts of dibromo-3.4.8.9-dibenzopyrene-5.10-quinone are stirred into a solution of 80 parts of hydrogen sulphide in 3000 parts of dimethylaniline, whereafter ammonia gas is passed through the mixture. After the reduction is complete, the reaction mixture is introduced into a mixture of 900 parts of chlorosulphonic acid, 2000 parts of dimethylaniline and 4000 parts of chlorobenzene. The mixture is then heated while stirring first to 20° C. and later on to 30–35° C. and, after esterification is complete, poured into an aqueous solution of 1400 parts of sodium carbonate. The dimethylaniline and chlorobenzene are removed by steam distillation, the remaining solution is filtered and the sodium salt of the acid sulphuric acid ester of leuco dibromo-dibenzopyrene-quinone isolated by salting out. It forms a reddish brown compound easily soluble in water.

Example 6

375 parts of anthraquinone-2.1-(N)-1'.2'-(N)-naphthacridone are stirred into 2000 parts of pyridine. A current of ammonia gas and hydrogen sulphide gas is then passed through the mixture, until a yellowish-red solution has formed. The mixture thus obtained is then applied for esterifying purposes by means of chlorosulphonic acid and pyridine as described in the above examples.

In this example the dyestuff mentioned may be replaced by equivalent quantities of 4.4'-dimethyl - 6.6' - dichlorothioindigo, the technical mixture of penta- and hexa-bromoindigo, 5.7-dichloroindol - 5'.6'.7'-trichlorothionaphthene-2.2'-indigo, the dyestuff of the formula

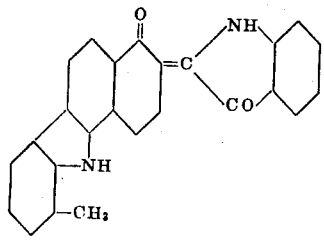

or the green dyestuff of the example of U. S. A. Patent No. 1,782,706, or by 3,4,8,9-dibenzopyrene-5.10-quinone.

We claim:—

1. In a process which comprises reducing a vat dyestuff and esterifying the reaction product thus obtained without isolating it, by mixing the reaction mixture with an addition product of a tertiary organic base with a compound of the group consisting of sulphur trioxide, agents containing free sulphur trioxide and agents being capable of splitting off sulphur trioxide under the conditions of working, esterification being performed in the presence of a tertiary organic base, and the total process being performed under substantially anhydrous conditions and in the absence of oxygen, the improvement which consists in carrying out the reduction of the vat dyestuff with hydrogen sulphide in the presence of anhydrous ammonia and of a tertiary organic base, which may be replaced by an organic solvent which is inert to the components of the reaction mixture.

2. In a process which comprises reducing a vat dyestuff and esterifying the leuco derivative of the vat dyestuff thus obtained without isolating it, by mixing the reaction mixture with an addition product of a tertiary organic base with a compound of the group consisting of sulphur trioxide, agents containing free sulphur trioxide and agents capable of splitting off sulphur trioxide, the esterification being performed at a temperature between about 5 and about 70° C., and the total process being performed under substantially anhydrous conditions and in the absence of oxygen, the improvement which consists in carrying out the reduction of the vat dyestuff with hydrogen sulphide in the presence of anhydrous ammonia and of a tertiary aromatic amine at a temperature between about 10 and about 50° C.

3. In a process which comprises reducing a vat dyestuff and esterifying the leuco derivative of the vat dyestuff thus obtained without isolating it, by mixing the reaction mixture with an addition product of a tertiary organic base and chlorosulphonic acid, the esterification being performed at a temperature between about 5 and about 70° C., and the total process being performed under substantially anhydrous conditions and in the absence of oxygen, the improvement which consists in carrying out the reduction of the vat dyestuff with hydrogen sulphide in the presence of anhydrous ammonia and of dimethylaniline at a temperature between about 10 and about 50° C.

4. In a process which comprises reducing a vat dyestuff and esterifying the leuco derivative of the vat dyestuff thus obtained without isolating it, by mixing the reaction mixture with an addition product of a tertiary organic base and a chlorosulphonic acid ester, the esterification being performed at a temperature between about 5 and about 70° C., and the total process being performed under substantially anhydrous conditions and in the absence of oxygen, the improvement which consists in carrying out the reduction of the vat dyestuff with hydrogen sulphide in the presence of anhydrous ammonia and of dimethylaniline at a temperature between about 10 and about 50° C.

WILHELM BAUER.
LUDWIG ZEH.
BERNHARD BOLLWEG.